United States Patent
Ishihara et al.

(10) Patent No.: US 10,385,912 B2
(45) Date of Patent: *Aug. 20, 2019

(54) CRANKSHAFT FOR RECIPROCATING ENGINE

(71) Applicant: NIPPON STEEL & SUMITOMO METAL CORPORATION, Tokyo (JP)

(72) Inventors: Koichiro Ishihara, Kyoto (JP); Ken Yoshino, Guangdong (CN); Kunihiro Yabuno, Matsubara (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/325,112

(22) PCT Filed: Jul. 14, 2015

(86) PCT No.: PCT/JP2015/003540
§ 371 (c)(1),
(2) Date: Jan. 10, 2017

(87) PCT Pub. No.: WO2016/009640
PCT Pub. Date: Jan. 21, 2016

(65) Prior Publication Data
US 2017/0167529 A1   Jun. 15, 2017

(30) Foreign Application Priority Data
Jul. 16, 2014   (JP) .................................. 2014-146263

(51) Int. Cl.
*F16C 3/20*    (2006.01)
*F02B 77/00*   (2006.01)
(Continued)

(52) U.S. Cl.
CPC .................. *F16C 3/20* (2013.01); *B21K 1/08* (2013.01); *F02B 77/00* (2013.01); *F16C 3/06* (2013.01); *F16C 3/08* (2013.01); *F16C 2360/22* (2013.01)

(58) Field of Classification Search
CPC ...... F16C 3/06; F16C 3/08; F16C 3/20; F16C 3/04; Y10T 74/2183; Y10T 74/2173; F16F 15/283; B21K 1/08
See application file for complete search history.

(56) References Cited

U.S. PATENT DOCUMENTS

2012/0024105 A1 *   2/2012   Ohnuma .................... B21J 5/02
74/605

FOREIGN PATENT DOCUMENTS

DE    2160586 A1 *   6/1973   ................ F16C 3/08
JP    08-226432        9/1996
(Continued)

OTHER PUBLICATIONS

Machine Translation of DE 2160586, obtained Jan. 8, 2018.*
Machine Translation of WO 2015056440, obtained Jun. 1, 2018.*

*Primary Examiner* — Richard W Ridley
*Assistant Examiner* — Brian J Mcgovern
(74) *Attorney, Agent, or Firm* — Clark & Brody

(57) ABSTRACT

A load due to combustion pressure is applied to each of the crank pins via a connecting rod in a direction from the axis of a piston pin to the axis of the crank pin. Each of the crank arms includes a recess in a surface adjacent to the journal, in a region inward of a peripheral region along the edge of the surface. The recess extends along the peripheral region, and is asymmetric with respect to a crank arm centerline connecting the axis of each of the crank pins to the axis of each of the journals. Each of the crank arms has a maximum flexural rigidity at a point of time when the load onto each of the crank pins due to the combustion pressure reaches a
(Continued)

maximum. The crankshaft has a reduced weight and an increased torsional rigidity in combination with an increased flexural rigidity.

5 Claims, 17 Drawing Sheets

(51) Int. Cl.
*F16C 3/08* (2006.01)
*B21K 1/08* (2006.01)
*F16C 3/06* (2006.01)

(56) References Cited

FOREIGN PATENT DOCUMENTS

| | | | |
|---|---|---|---|
| JP | 11-125235 | 5/1999 | |
| JP | 2004-538429 | 12/2004 | |
| JP | 2004-538430 | 12/2004 | |
| JP | 2010-230027 | 10/2010 | |
| JP | 2012-07726 | 1/2012 | |
| JP | 4998233 | 8/2012 | |
| WO | WO-2015056440 A1 * | 4/2015 | ................ F16C 3/08 |

* cited by examiner

FIG. 2
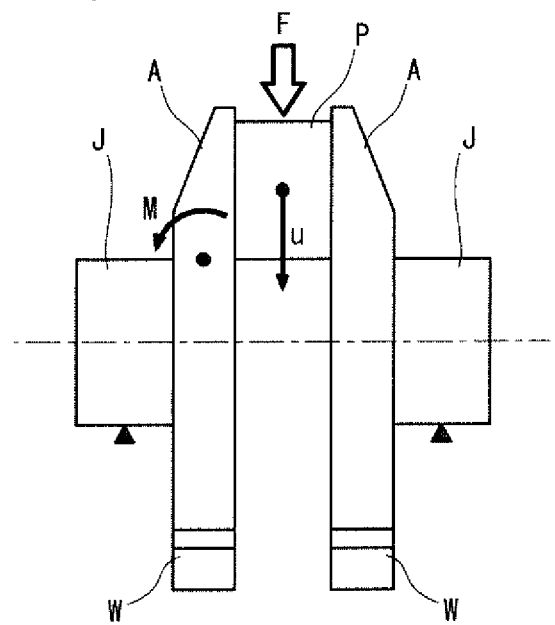
FIG. 3
(a)
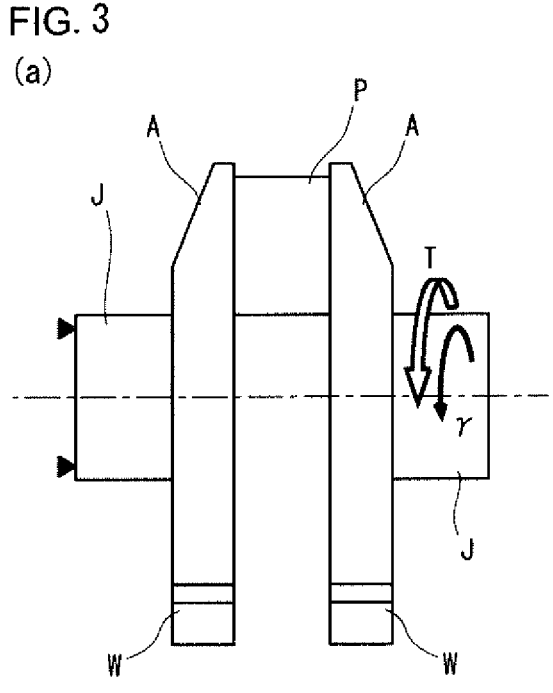
(b)
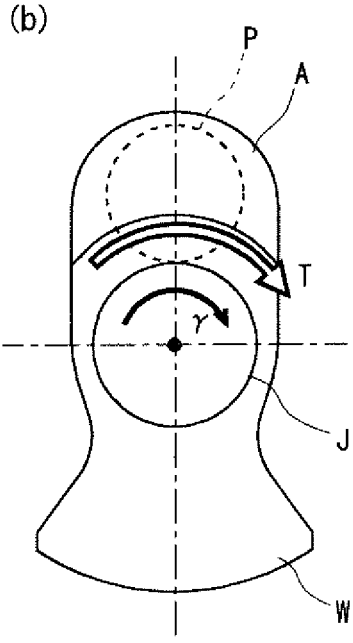

(a) Rectagular Cross Section
(b) Projected Cross Section
(c) Recessed Cross Section Prior Art
FIG. 18
(a)
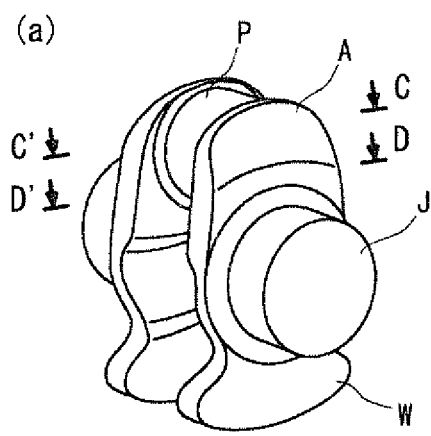
(b) C-C'
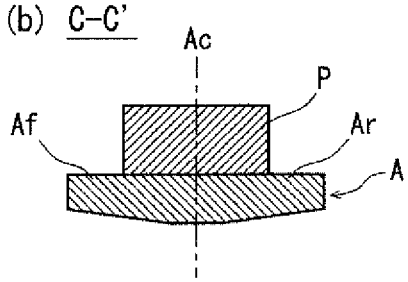
(c) D-D'
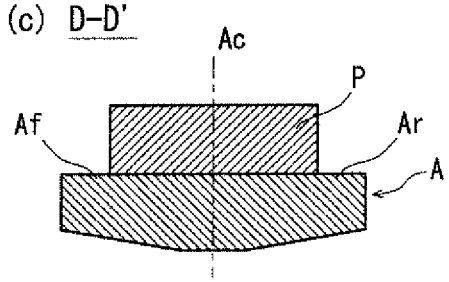
Prior Art                 Prior Art

CRANKSHAFT FOR RECIPROCATING ENGINE

TECHNICAL FIELD

The present invention relates to crankshafts to be mounted in reciprocating engines such as automotive engines, marine engines, and multiple purpose engines used in, for example, power generators.

BACKGROUND ART

A reciprocating engine requires a crankshaft for converting the reciprocating motion of pistons in cylinders to rotational motion so as to extract power. Crankshafts are generally categorized into two classes: the type manufactured by die forging and the type manufactured by casting. Especially when high strength and high stiffness are required, the firstly mentioned die forged crankshafts, which are excellent in these properties, are often employed.

FIG. 1 is a schematic side view of an example of a common crankshaft. A crankshaft 1 shown in FIG. 1 is designed to be mounted in a 4-cylinder engine and includes: five journals J1 to J5; four crank pins P1 to P4; a front part Fr, a flange Fl, and eight crank arms A1 to A8 (hereinafter also referred to simply as "arms") that connect the journals J1 to J5 and the crank pins P1 to P4 to each other. The crankshaft 1 is configured such that all of the eight crank arms A1 to A8 are formed integrally with counterweights W1 to W8 (hereinafter also referred to as "weights"), respectively, and is referred to as a 4-cylinder 8-counterweight crankshaft.

Hereinafter, when the journals J1 to J5, the crank pins P1 to P4, the crank arms A1 to A8, and the counterweights W1 to W8 are each collectively referred to, the reference character "J" is used for the journals, "P" for the crank pins, "A" for the crank arms, and "W" for the counterweights. A crank pin P and a pair of crank arms A (including the counterweights W) which connect with the crank pin P are also collectively referred to as a "throw".

The journals J, the front part Fr, and the flange Fl are arranged coaxially with the center of rotation of the crankshaft 1. The crank pins P are arranged at positions eccentric with respect to the center of rotation of the crankshaft 1 by half the distance of the piston stroke. The journals J are supported by the engine block by means of sliding bearings and serve as the central rotational axis. The big end of a connecting rod (hereinafter referred to as "conrod") is coupled to the crank pin P by means of a sliding bearing, and a piston is coupled to the small end of the conrod.

In an engine, fuel explodes within cylinders. The combustion pressure generated by the explosion causes reciprocating motion of the pistons, which is converted into rotational motion of the crankshaft 1. In this regard, the combustion pressure acts on the crank pins P of the crankshaft 1 via the conrod and is transmitted to the journals J via the respective crank arms A connecting to the crank pins P. In this process, the crankshaft 1 rotates while repetitively undergoing elastic deformation.

The bearings that support the journals of the crankshaft are supplied with lubricating oil. In response to the elastic deformation of the crankshaft, the oil film pressure and the oil film thickness in the bearings vary in correlation with the bearing load and the journal center orbit. Furthermore, depending on the surface roughness of the journals and the surface roughness of the bearing metal in the bearings, not only the oil film pressure but also local metal-to-metal contact occurs. Ensuring a sufficient oil film thickness is important in order to prevent seizure of the bearings due to lack of lubrication and to prevent local metal-to-metal contact, thus affecting the fuel economy performance.

In addition, the elastic deformation accompanied with the rotation of the crankshaft and the movements of the center orbit of the journals within the clearances of the bearings cause an offset of the center of rotation, and therefore affect the engine vibration (mount vibration). Furthermore, the vibration propagates through the vehicle body and thus affects the noise in the vehicle and the ride quality.

In order to improve such engine performance properties, there is a need for a crankshaft having high stiffness with the ability to resist deformation. In addition, there is a need for weight reduction of the crankshaft.

A crankshaft is subjected to loads due to pressure in cylinders (combustion pressure in cylinders) and centrifugal force of rotation. In order to impart deformation resistance to the loads, an attempt is made to improve the torsional rigidity and the flexural rigidity of the crankshaft. In designing a crankshaft, the main specifications such as the journal diameter, the crank pin diameter, and the piston stroke are firstly determined. The region to be designed after determination of the main specifications is the shape of the crank arms. Thus, the design of the crank arm shape for increasing both the torsional rigidity and the flexural rigidity is an important requirement. Strictly speaking, as described above, the crank arms mean the oval portions connecting the journals and the pins to each other and do not include the portions serving as counterweights.

In the meantime, a crankshaft needs to have a mass distribution that ensures static balance and dynamic balance so as to be able to rotate kinematically smoothly as a rotating body. Accordingly, an important requirement is to adjust the mass of the counterweight region with respect to the mass of the crank arm region determined by the requirements for the flexural rigidity and torsional rigidity, in view of weight reduction while ensuring the static balance and dynamic balance.

For the static balance, the adjustment is made so that when the mass moment (the "mass" multiplied by the "radius of the center of mass") of the crank arm region and the counterweight region are summed, the result is zero. For the dynamic balance, the adjustment is made so that, when, for each region, the product of the axial distance from the reference point to the center of mass multiplied by the mass moment (the "mass" multiplied by the "radius of the center of mass" multiplied by the "axial distance") is determined using a point on the rotation axis of the crankshaft as the reference and the products are summed, the result is zero.

Furthermore, the balance ratio is adjusted for balancing against the load of combustion pressure within one throw (a region of the crankshaft corresponding to one cylinder). The balance ratio is defined as a ratio of the mass moment of the counterweight region to the mass moment of the crank arm region including the crank pin (and also including part of the conrod, strictly speaking) in the crankshaft, and this balance ratio is adjusted to fall within a certain range.

There is a trade-off between an increase in stiffness of the crank arm of a crankshaft and a reduction in weight thereof, but heretofore various techniques relating to the crank arm shape have been proposed in an attempt to meet both needs. Such conventional techniques include the following.

Japanese Patent No. 4998233 (Patent Literature 1) discloses a crank arm having intensively greatly depressed recess grooves in the crank pin-side surface of the crank arm and the journal-side surface thereof, on a straight line connecting the axis of the journal to the axis of the crank pin (hereinafter also referred to as a "crank arm centerline"). The crank arm disclosed in Patent Literature 1 is intended to achieve a reduction in weight and an increase in stiffness. The recess groove in the journal-side surface contributes to a reduction in weight by virtue of the reduced mass, and moreover, the thick region around the recess groove contributes to an increase in torsional rigidity. However, in reality, an increase in flexural rigidity cannot be substantially expected because of the intensively greatly depressed recess grooves on the crank arm centerline.

Japanese Translation of PCT International Application Publication No. 2004-538429 (Patent Literature 2), Japanese Translation of PCT International Application Publication No. 2004-538430 (Patent Literature 3), Japanese Patent Application Publication No. 2012-7726 (Patent Literature 4), and Japanese Patent Application Publication No. 2010-230027 (Patent Literature 5) each disclose a crank arm having a greatly and deeply depressed hollow portion in the journal-side surface of the crank arm, on the crank arm centerline. The crank arms disclosed in Patent Literatures 2 to 5 are also intended to achieve a reduction in weight and an increase in torsional rigidity. However, in reality, the flexural rigidity is reduced because of the greatly and deeply depressed hollow portion on the crank arm centerline.

CITATION LIST

Patent Literature

Patent Literature 1: Japanese Patent No. 4998233
Patent Literature 2: Japanese Translation of PCT International Application Publication No. 2004-538429
Patent Literature 3: Japanese Translation of PCT International Application Publication No. 2004-538430
Patent Literature 4: Japanese Patent Application Publication No. 2012-7726
Patent Literature 5: Japanese Patent Application Publication No. 2010-230027

SUMMARY OF INVENTION

Technical Problem

With the techniques disclosed in Patent Literatures 1 to 5, it is possible to provide a crankshaft with a reduced weight and an increased torsional rigidity. However, the conventional techniques have their limits in increasing the flexural rigidity of a crankshaft, and therefore technological innovation therefor is strongly desired.

The present invention has been made in view of the above circumstances. An object of the present invention is to provide a crankshaft for reciprocating engines which has a reduced weight and an increased torsional rigidity in combination with an increased flexural rigidity.

Solution to Problem

According to an embodiment of the present invention, a crankshaft for a reciprocating engine includes: journals that define a central axis of rotation; crank pins that are eccentric with respect to the journals; crank arms connecting the journals to the crank pins; and counterweights integrated with the crank arms. When the crankshaft is mounted in the reciprocating engine, a load due to combustion pressure is applied to each of the crank pins via a connecting rod in a direction from an axis of a piston pin to an axis of the crank pin. Each of the crank arms includes a recess in a surface adjacent to the journal, the recess being disposed in a region inward of a peripheral region along an edge of the surface and extending along the peripheral region. The recess is asymmetric with respect to a crank arm centerline connecting the axis of each of the crank pins to the axis of each of the journals. Each of the crank arms has a maximum flexural rigidity at a point of time when the load onto each of the crank pins due to the combustion pressure reaches a maximum.

The above-described crankshaft may be configured such that the peripheral region of each of the crank arms has a thickness that is asymmetric with respect to the crank arm centerline.

The above-described crankshaft is preferably configured as follows. When each of the crank arms is divided by the crank arm centerline into a right arm portion and a left arm portion, in each section of each of the crank arms on a plane perpendicular to the crank arm centerline at a position outward of the axis of the crank pin, an area moment of inertia of one of the right and the left arm portions that is in a side that is subjected to the maximum load is greater than an area moment of inertia of the other arm portion that is in a side opposite to the side that is subjected to the maximum load, and in each section of each of the crank arms on a plane perpendicular to the crank arm centerline at a position inward of the axis of the crank pin, the area moment of inertia of the arm portion that is in the side opposite to the side that is subjected to the maximum load is greater than the area moment of inertia of the arm portion that is in the side that is subjected to the maximum load.

In this crankshaft, in each section of each of the crank arms on a plane perpendicular to the crank arm centerline at a position outward of the axis of the crank pin, a maximum thickness of the arm portion that is in the side that is subjected to the maximum load is greater than a maximum thickness of the arm portion that is in the side opposite to the side that is subjected to the maximum load, and in each section of each of the crank arms on a plane perpendicular to the crank arm centerline at a position inward of the axis of the crank pin, the maximum thickness of the arm portion that is in the side opposite to the side that is subjected to the maximum load is greater than the maximum thickness of the arm portion that is in the side that is subjected to the maximum load.

This crankshaft may be configured as follows. In each section of each of the crank arms on a plane perpendicular to the crank arm centerline at a position outward of the axis of the crank pin, a width of the arm portion that is in the side that is subjected to the maximum load is greater than a width of the arm portion that is in the side opposite to the side that is subjected to the maximum load, and in each section of each of the crank arms on a plane perpendicular to the crank arm centerline at a position inward of the axis of the crank pin, the width of the arm portion that is in the side opposite to the side that is subjected to the maximum load is greater than the width of the arm portion that is in the side that is subjected to the maximum load.

Advantageous Effects of Invention

In the crankshaft according to the present invention, the crank arm has a recess in the surface adjacent to a journal. The recess is formed to fit for reality, and the recess is asymmetric with respect to the arm centerline. Thereby, the peripheral region of the crank arm is thick, and the region inward thereof is thin because of the recess. Moreover, the central region further inward thereof is thick. The crank arm with this configuration has a reduced weight and an increased torsional rigidity in combination with an increased flexural rigidity.

BRIEF DESCRIPTION OF DRAWINGS

FIG. 2 is a schematic diagram illustrating a method for evaluating the flexural rigidity of a crank arm;

FIGS. 3(a) and 3(b) are schematic diagrams illustrating a method for evaluating the torsional rigidity of a crank arm, wherein FIG. 3(a) is a side view of a throw, and FIG. 3(b) is a front view thereof in the axial direction.

FIGS. 4(a) to 4(c) are diagrams showing typical examples in which the crank arm is assumed to be a simple circular plate, wherein FIG. 4(a) shows a circular plate having a rectangular cross section, FIG. 4(b) shows a circular plate having a projected cross section, and FIG. 4(c) shows a circular plate having a recessed cross section.

FIGS. 5(a) to 5(c) are diagrams showing typical examples in which the crank arm is assumed to be a simple beam from the standpoint of flexural rigidity in the sense of Strength of Materials, wherein FIG. 5(a) shows a beam having a rectangular cross section, FIG. 5(b) shows a beam having a projected cross section, and FIG. 5(c) shows a beam having a recessed cross section.

FIGS. 11(a) and 11(b) are diagrams showing examples of beam shapes according to the beam theory in Strength of Materials, wherein FIG. 11(a) shows a rectangular cross-sectional beam, and FIG. 11(b) shows a beam with a reduced weight.

FIGS. 12(a) to 12(c) are diagrams showing a crank arm having a laterally asymmetric shape in accordance with the concept of a lightweight beam shown by FIG. 11(b), wherein FIG. 12(a) is a perspective view, and FIGS. 12(b) and 12(c) are sectional views on planes perpendicular to the crank arm centerline.

FIGS. 18(a) to 18(c) are diagrams showing an example of the shape of a crank arm of a conventional crankshaft.

DESCRIPTION OF EMBODIMENTS

Figure 1:
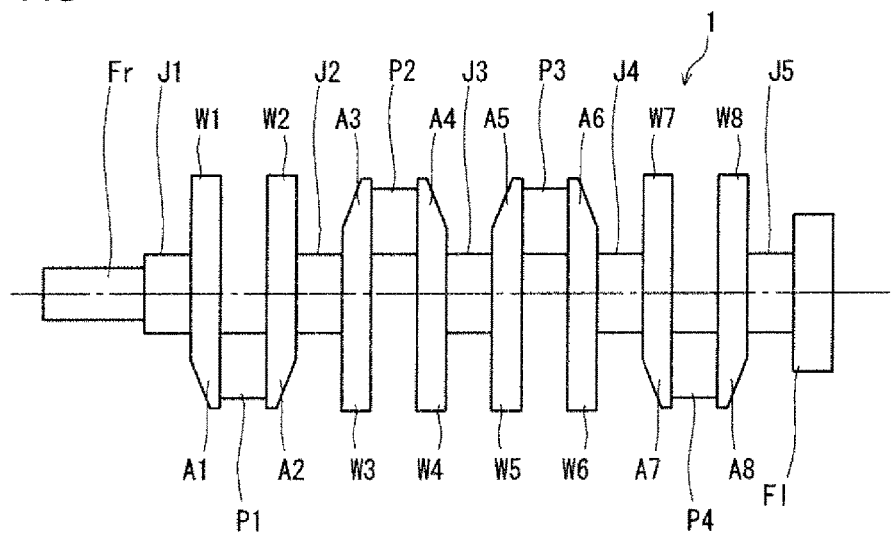
FIG. 1 is a schematic side view of an example of a common crankshaft.

Embodiments of the crankshaft for reciprocating engines according to the present invention will now be described.

1. Basic Techniques to Consider in Designing Crankshaft 1-1. Flexural Rigidity of Crank Arm FIG. 2 is a schematic diagram illustrating a method for evaluating the flexural rigidity of a crank arm. As shown in FIG. 2, in each throw of the crankshaft, a load F of combustion pressure generated by the explosion in the cylinder is applied to the crank pin P via a conrod. Since the journals J at the both ends of each throw are supported by bearings, the load F is transmitted to the journal bearings from the crank pin P via the crank arms A. Thus, each of the crank arms A is put into a state in which a load of three-point bending is applied thereto, and a bending moment M acts on the crank arm A. Accordingly, in each crank arm A, compressive stress occurs at the outside in the thickness direction (the side adjacent to the journal J), and tensile stress occurs at the inside in the thickness direction (the side adjacent to the pin P).

In the case where the diameters of the crank pin P and the journal J have been determined as design specifications, the flexural rigidity of the crank arm A depends on the crank arm shape of each throw. The counterweight W seldom contributes to the flexural rigidity. The displacement u of the axial center of the crank pin P in the direction in which the load of combustion pressure is applied is proportional to the load F of combustion pressure applied to the crank pin P and is inversely proportional to the flexural rigidity as shown in the following formula (1).

$$u \text{ proportional to } F/(\text{Flexural Rigidity}) \qquad (1)$$

1-2. Torsional Rigidity of Crank Arm

FIGS. 3(a) and 3(b) are schematic diagrams illustrating a method for evaluating the torsional rigidity of a crank arm, wherein FIG. 3(a) is a side view of a throw, and FIG. 3(b) is a front view thereof in the axial direction. The crankshaft rotates about the journal J, which causes a torsional torque T as shown in FIGS. 3(a) and 3(b). Thus, it is necessary to enhance the torsional rigidity of the crank arm A in order to ensure smooth rotation against the torsional vibrations of the crankshaft without causing resonance.

In the case where the diameters of the crank pin P and the journal J have been determined as design specifications, the torsional rigidity of the crank arm A depends on the crank arm shape of each throw. The counterweight W seldom contributes to the torsional rigidity. The torsion angle γ of the journal J is proportional to the torsional torque T and inversely proportional to the torsional rigidity as shown in the following formula (2).

$$\gamma \text{ proportional to } T/(\text{Torsional Rigidity}) \qquad (2)$$

2. Crankshaft of Present Embodiment 2-1. Approach for Increasing Stiffness of Crank Arm As stated above, the counterweight seldom contributes to the flexural rigidity and torsional rigidity. Accordingly, the present embodiment provides a crank arm shape that can achieve a reduction in weight and an increase in flexural rigidity in combination with an increase in torsional rigidity.

2-1-1. Shape for Increasing Torsional Rigidity

Here, an exemplary shape for increasing the torsional rigidity is studied based on the theory of Strength of Materials. For the crank arm A shown in FIGS. 3(a) and 3(b), an effective way to increase its torsional rigidity while maintaining a reduced weight is to increase its polar area moment of inertia.

Figure 4:
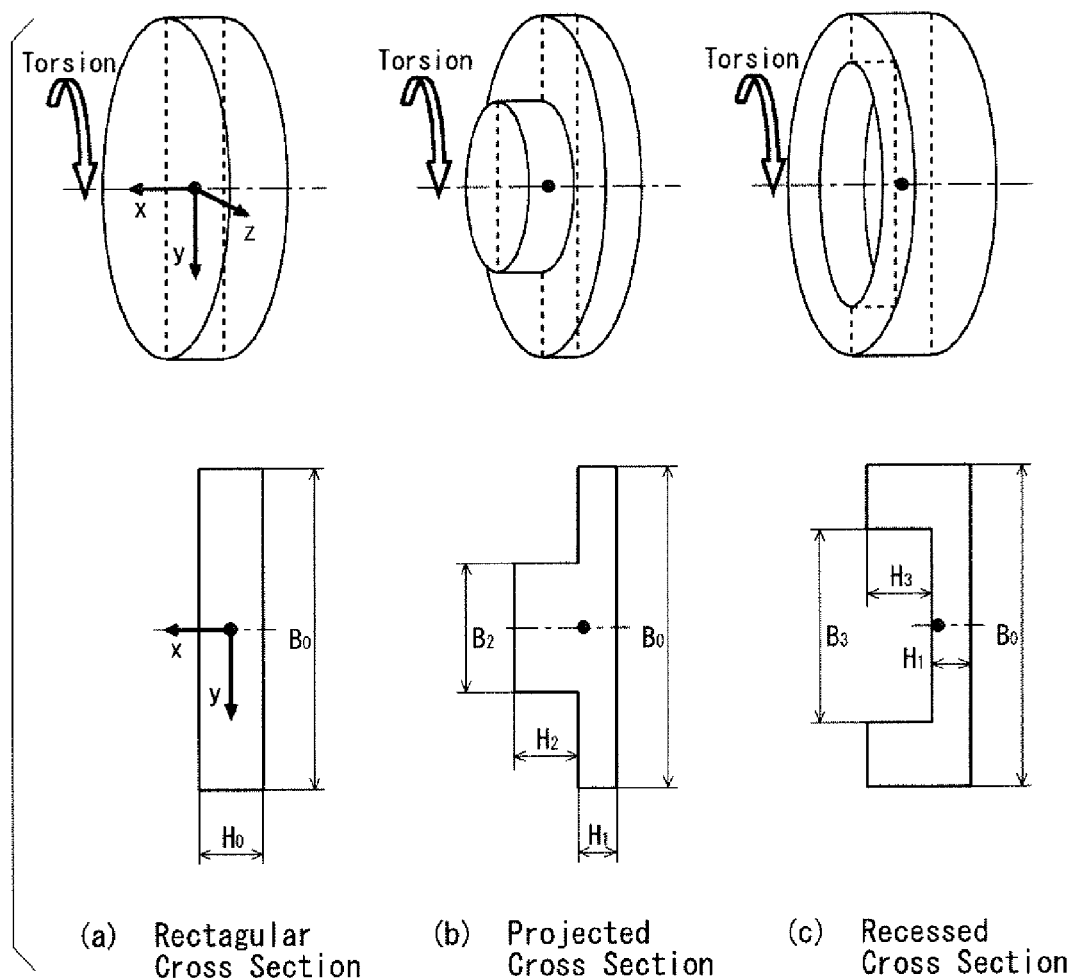

FIGS. 4(a) to 4(c) are diagrams showing typical examples in which the crank arm is assumed to be a simple circular plate from the standpoint of torsional rigidity in the sense of Strength of Materials, wherein FIG. 4(a) shows a circular plate having a rectangular cross section, FIG. 4(b) shows a circular plate having a projected cross section, and FIG. 4(c) shows a circular plate having a recessed cross section. In each of FIGS. 4(a) to 4(c), the upper section indicates a perspective view, and the lower section indicates a sectional view. The rectangular cross section type circular plate shown in FIG. 4(a), the projected cross section type circular plate shown in FIG. 4(b), and the recessed cross section type circular plate shown in FIG. 4(c) are assumed to be of equal weight. In other words, these circular plates are of equal volume in spite of the varied cross sections in rectangular, projected, and recessed shapes.

Specifically, the rectangular cross section type circular plate shown in FIG. 4(a) has a rectangular cross-sectional shape, and has a thickness of $H_0$ and a diameter of $B_0$. The projected cross section type circular plate shown in FIG. 4(b) has a projected cross-sectional shape in which the central portion projects with respect to the outer peripheral portion, and the diameter of the outermost circumference of the circular plate is $B_0$. The projection in the central portion has a thickness of $H_2$ and a diameter of $B_2$, and the outer peripheral portion has a thickness of $H_1$. The recessed cross section type circular plate shown in FIG. 4(c) has a recessed cross-sectional shape in which the central portion is recessed with respect to the outer peripheral portion, and the diameter of the outermost circumference of the circular plate is $B_0$. The central portion has a thickness of $H_1$ with the recession having a depth of $H_3$ and having a diameter of $B_3$.

The magnitude relationship between the torsional rigidities of the respective circular plates is investigated under the condition that they are of equal weight. In general, according to the theory of Strength of Materials, there is a relationship between the torsional rigidity, the polar area moment of inertia, and the torsion angle as shown in the following formulae (3) to (5). The relationship shown in the formulae indicates that increasing the polar area moment of inertia is effective at increasing the torsional rigidity.

Torsional rigidity: $G \times J/L$ (3)

Polar area moment of inertia: $J = (\pi/32) \times d^4$ (4)

Torsion angle: $\gamma = T \times L/(G \times J)$ (5)

where L represents the axial length, G represents the modulus of rigidity, d represents the radius of the round bar, and T represents the torsional torque.

The condition that the three types of circular plates shown in FIGS. 4(a) to 4(c) are of equal weight means the condition that they are of equal volume. Accordingly, the relationship indicated by the following formula (6) is established among the dimensional parameters of the three types of circular plates.

$$(\pi/4) \times B_0 \times B_0 \times H_0 = (\pi/4) \times (B_0 \times B_0 \times H_1 + B_2 \times B_2 \times H_2) = (\pi/4) \times \{B_0 \times B_0 \times (H_1+H_3) - B_3 \times B_3 \times H_3)\} \quad (6)$$

The polar area moments of inertia of the three types of circular plates are expressed by the following formulae (7) to (9), respectively, taking into account the thicknesses.

Polar area moment of inertia of a rectangular cross section type circular plate:

$$J_{(A)} = (\pi/32) \times H_0 \times B_0^4 \quad (7)$$

Polar area moment of inertia of a projected cross section type circular plate:

$$J_{(B)} = (\pi/32) \times (H_1 \times B_0^4 + H_2 \times B_2^4) \quad (8)$$

Polar area moment of inertia of a recessed cross section type circular plate:

$$J_{(C)} = (\pi/32) \times \{(H_1+H_3) \times B_0^4 - H_3 \times B_3^4\} \quad (9)$$

Based on the formulae (7) to (9), the magnitude relationship between the polar area moment of inertia $J_{(A)}$ of a rectangular cross section type circular plate, the polar area moment of inertia $J_{(B)}$ of a projected cross section type circular plate, and the polar area moment of inertia $J_{(C)}$ of a recessed cross section type circular plate is expressed by the following formula (10).

$$J_{(B)} < J_{(A)} < J_{(C)} \quad (30)$$

This formula (10) is the conclusion drawn theoretically from Strength of Materials. This conclusion can be understood from the observation in the sense of Strength of Materials that, qualitatively speaking, a cross-sectional shape in which materials are placed in greater proportion in locations farther from the torsion center provides a higher polar area moment of inertia.

For example, a case is considered as an illustrative example in which the dimensional parameters are set as follows so that the condition of equal weight, i.e., the condition of the above formula (6) can be satisfied: $B_0=100$ mm, $H_0=20$ mm, $H_1=10$ mm, $H_2=H_3=20$ mm, and $B_2=B_3=100/\sqrt{2}=70.71$ mm.

In the case of this illustrative example, the polar area moment of inertia $J_{(A)}$ of a rectangular cross section type circular plate is determined as shown in the following formula (11) according to the above formula (7).

$$J_{(A)} = 1.96 \times 10^8 \quad (11)$$

The polar area moment of inertia $J_{(B)}$ of a projected cross section type circular plate is determined as shown in the following formula (12) according to the above formula (8).

$$J_{(B)} = 1.47 \times 10^8 \quad (12)$$

The polar area moment of inertia $J_{(C)}$ of a recessed cross section type circular plate is determined as shown in the following formula (13) according to the above formula (9).

$$J_{(C)} = 2.45 \times 10^8 \quad (13)$$

The formulae (11) to (13) numerically confirm that the relationship expressed by the above formula (10) holds.

Thus, projected cross section type circular plates, rectangular cross section type circular plates, and recessed cross section type circular plates are in ascending order in magnitude of torsional rigidity against torsional loads, and therefore the shape of recessed cross section type circular plates is the best.

2-1-2. Shape for Increasing Flexural Rigidity

Here, an exemplary shape for increasing the flexural rigidity is studied based on the theory of Strength of Materials. For the crank arm A shown in FIG. 2, an efficient way to increase its flexural rigidity while maintaining a reduced weight is to increase its area moment of inertia against bending.

Figure 5:
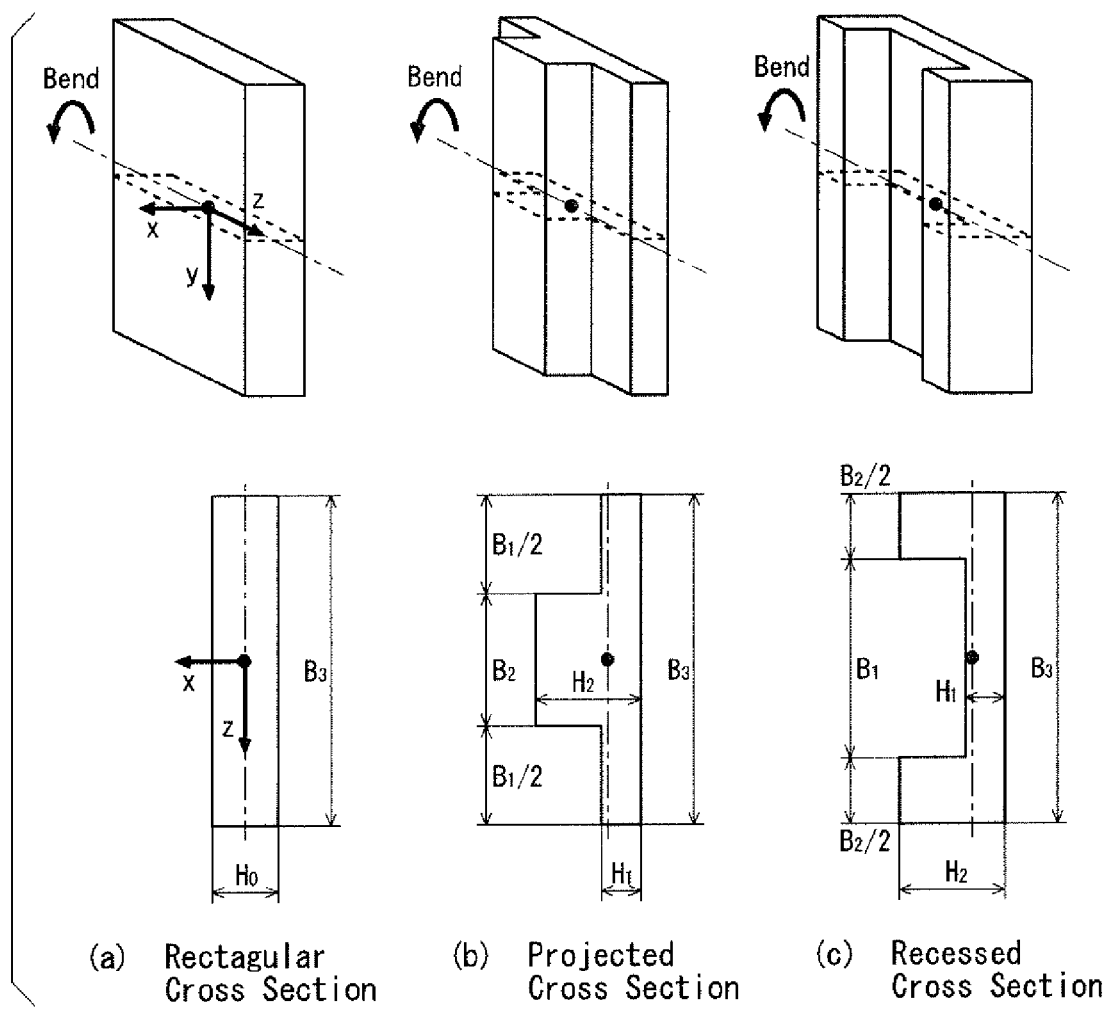

FIGS. 5(a) to 5(c) are diagrams showing typical examples in which the cross-sectional shape of the crank arm is simplified and the crank arm is assumed to be a simple beam from the standpoint of flexural rigidity in the sense of Strength of Materials, wherein FIG. 5(a) shows a beam having a rectangular cross section, FIG. 5(b) shows a beam having a projected cross section, and FIG. 5(c) shows a beam having a recessed cross section. In each of FIGS. 5(a) to 5(c), the upper section indicates a perspective view, and the lower section indicates a sectional view. The rectangular cross section type beam shown in FIG. 5(a), the projected cross section type beam shown in FIG. 5(b), and the recessed cross section type beam shown in FIG. 5(c) are assumed to be of equal weight. In other words, these beams are of equal cross-sectional area in spite of the varied cross sections in rectangular, projected, and recessed shapes.

Specifically, the rectangular cross section type beam shown in FIG. 5(a) has a rectangular cross-sectional shape, and has a thickness of $H_0$ and a maximum width of $B_3$. The projected cross section type beam shown in FIG. 5(b) has a projected cross-sectional shape in which the central portion projects with respect to the opposite side portions, and the maximum width of the beam is $B_3$. The central portion has a thickness of $H_2$ and a width of $B_2$, and the opposite side portions each have a thickness of $H_1$ and a width of $B_1/2$. The recessed cross section type beam shown in FIG. 5(c) has a recessed cross-sectional shape in which the central portion is recessed with respect to the opposite side portions, and the maximum width of the beam is $B_3$. The central portion has a thickness of $H_1$ and a width of $B_1$, and the opposite side portions each have a thickness of $H_2$ and a width of $B_2/2$.

The magnitude relationship between the stiffnesses of the respective beams against bending loads is investigated under the condition that they are of equal weight. In general, the relationship between the flexural rigidity of a rectangular beam and the area moment of inertia thereof is expressed by the following formulae (14) to (16) based on the theory of Strength of Materials. The relationship shown in the formulae indicates that increasing the area moment of inertia results in increasing the flexural rigidity.

Flexural Rigidity: $E \times I$ (14)

Area moment of inertia: $I = (1/12) \times b \times h^3$ (15)

Flexural displacement: $u = k(M/(E \times I))$ (16)

where b represents the width, h represents the thickness, E represents the Young's modulus, M represents the bending moment, and k represents the shape factor.

The condition that the three types of beams shown in FIGS. 5(a) to 5(c) are of equal weight means the condition that they are of equal volume, i.e., they are of equal cross-sectional area. Accordingly, the relationship indicated by the following formula (17) is established among the dimensional parameters of the three types of beams.

$B_3 \times H_0 = (H_2 \times B_2 + B_1 \times H_1) = (H_2 \times B_2 + B_1 \times H_1)$ (17)

The area moments of inertia of the three types of beams are expressed by the following formulae (18) to (20), respectively.

Area moment of inertia of a rectangular cross section type beam:

$I_{(D)} = (1/12) \times B_3 \times H_0^3$ (18)

Area moment of inertia of a projected cross section type beam:

$I_{(E)} = 1/3 \times (B_3 \times E_2^3 - B_1 \times H_3^3 + B_2 \times E_1^3)$ (19)

where $E_2$ is determined by "$(B_2 \times H_2^2 + B_1 \times H_1^2)/\{2 \times (B_2 \times H_2 + B_1 \times H_1)\}$", $E_1$ is determined by "$H_2 - E_2$", and $H_3$ is determined by "$E_2 - H_1$".

Area moment of inertia of a recessed cross section type beam:

$I_{(F)} = 1/3 \times (B_3 \times E_2^3 - B_1 \times H_3^3 + B_2 \times E_1^3)$ (20)

where $E_2$ is determined by "$(B_2 \times H_2^2 + B_1 \times H_1^2)/\{2 \times (B_2 \times H_2 + B_1 \times H_1)\}$", $E_1$ is determined by "$H_2 - E_2$", and $H_3$ is determined by "$E_2 - H_1$".

The above formulae (19) and (20) are in the same form. This indicates that the area moment of inertia $I_{(E)}$ of a projected cross section type beam equals the area moment of inertia $I_{(F)}$ of a recessed cross section type beam under the condition that they are of equal weight.

In short, the magnitude relationship between the area moment of inertia $I_{(D)}$ of a rectangular cross section type beam, the area moment of inertia $I_{(E)}$ of a projected cross section type beam, and the area moment of inertia $I_{(F)}$ of a recessed cross section type beam is expressed by the following formula (21).

$I_{(D)} < I_{(E)} = I_{(F)}$ (21)

This formula (21) is the conclusion drawn theoretically from Strength of Materials. This conclusion can be understood from the observation in the sense of Strength of Materials that, qualitatively speaking, a cross-sectional shape such that materials are placed in greater proportion in locations farther from the neutral plane of bending provides a higher area moment of inertia.

For example, a case is considered as an illustrative example in which the dimensional parameters are set as follows so that the condition of the equal weight, i.e., the condition of the above formula (17) can be satisfied: $B_1 = B_2 = 50$ mm, $B_3 = 100$ mm, $H_0 = 20$ mm, $H_1 = 10$ mm, and $H_2 = 30$ mm, by which $E_1 = 12.5$ mm, $E_2 = 17.5$ mm, and $H_3 = 7.5$ mm.

In the case of this illustrative example, the area moment of inertia hp) of a rectangular cross section type beam is determined as shown in the following formula (22) according to the above formula (18).

$I_{(D)} = 6.67 \times 10^4$ (22)

The area moment of inertia $I_{(E)}$ of a projected cross section type beam is determined as shown in the following formula (23) according to the above formula (19).

$I_{(E)} = 2.04 \times 10^5$ (23)

The area moment of inertia $I_{(F)}$ of a recessed cross section type beam is determined as shown in the following formula (24) according to the above formula (20).

$I_{(F)} = 2.04 \times 10^5$ (24)

The formulae (22) to (24) numerically confirm that the relationship expressed by the above formula (21) holds.

Thus, projected cross section type beams and recessed cross section type beams have comparable flexural rigidities against bending loads, and therefore partially thickened crank arm shapes such as those of a projected cross section type beam and a recessed cross section type beam are preferable to the shape of a rectangular cross section type beam because such thickened crank arm shapes provide a higher flexural rigidity.

Figure 6:
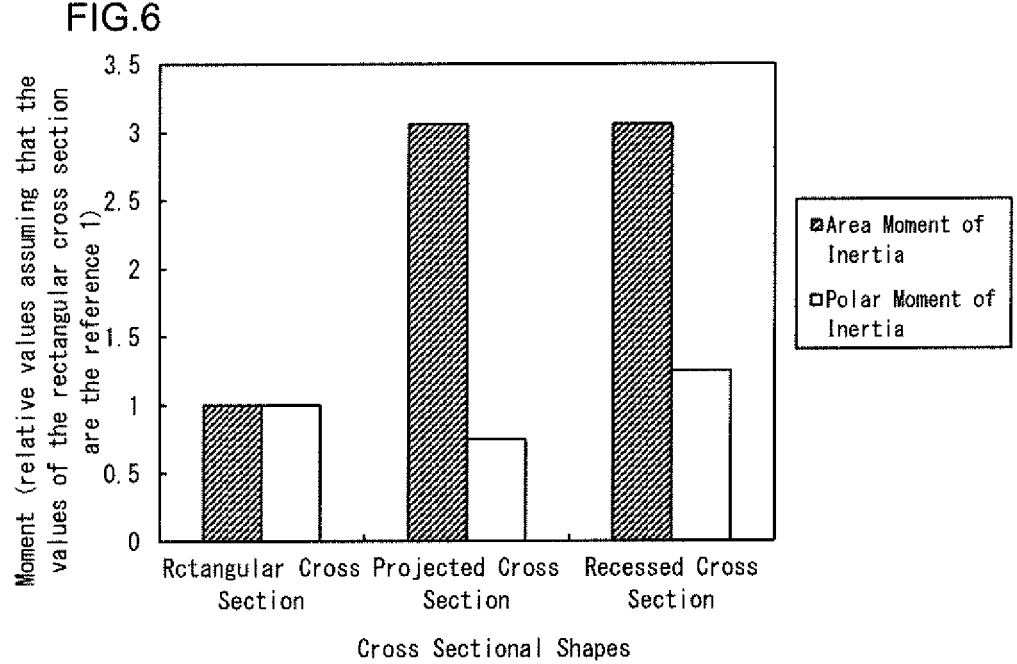
FIG. 6 is a graph summarizing the magnitude relationships between the beams having the respective cross-sectional shapes in the area moment of inertia and in the polar moment of inertia, which are directly related to flexural rigidity and torsional rigidity.

2-1-3. Summarization of Shapes for Increasing Flexural Rigidity and Torsional Rigidity FIG. 6 is a graph summarizing the magnitude relationships between the beams having the respective cross-sectional shapes in the area moment of inertia and in the polar moment of inertia, which are directly related to flexural rigidity and torsional rigidity. In FIG. 6, the polar moments of inertia and the area moments of inertia resulting from the cross sectional shapes shown in FIGS. 4(*a*) to 4(*c*) and FIGS. 5(*a*) to 5(*c*), i.e., the rectangular cross section, the projected cross section, and the recessed cross section, are presented as relative values assuming that the values of the rectangular cross section are the reference "1".

The results shown in FIG. 6 indicate that the projected or recessed cross-sectional shape results in an increase in flexural rigidity while the recessed cross-sectional shape results in an increase in torsional rigidity, and therefore it is believed that, when these shapes are combined, both the flexural rigidity and the torsional rigidity increase. Thus, an effective way to increase both the flexural rigidity and the torsional rigidity is to design the crank arm to have a cross-sectional shape that is a combination of a projected shape and a recessed shape. Specifically, the peripheral region along the edge of the crank arm is configured to be thick, the region inward of the peripheral region is configured to be thin, and the central region further inward thereof (a region through which the crank arm centerline passes and which is adjacent to the journal) is configured to be thick. By configuring the peripheral region, which is farther from the torsion center of the crank arm, to be thick and configuring the region inward thereof to be thin, it is possible to ensure a high torsional rigidity while achieving a reduction in weight. The large thickness of the peripheral region of the crank arm contributes to ensuring of the flexural rigidity. In addition, the large thickness of the central region of the crank arm contributes to ensuring of the flexural rigidity.

Figure 7:
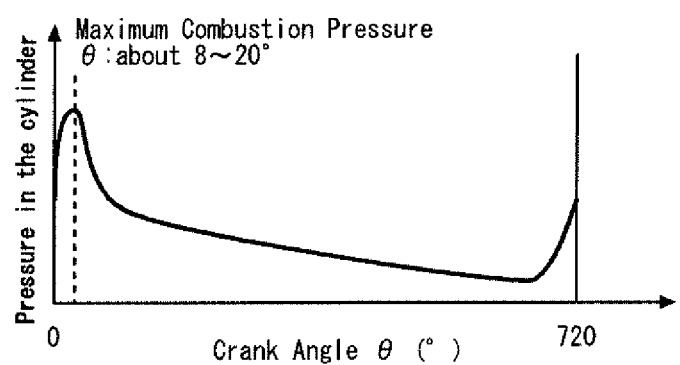
FIG. 7 is a graph indicating a curve showing the pressure in a cylinder of a four-cycle engine.

2-2. Approach for Increasing Stiffness of Crank Arm in Consideration of Reality FIG. 7 is a graph indicating a curve showing the pressure in a cylinder of a four-cycle engine. In FIG. 7, when the position of the crankshaft where the crank pin comes to a top dead point in a compression process is considered as a reference (point of crank angel θ of 0 degrees), an explosion occurs immediately after the top dead point in the compression process. Accordingly, the pressure in the cylinder becomes a maximum combustion pressure when the crank angle θ becomes about 8 to 20 degrees. The crankshaft is subjected to the load of pressure in the cylinder (combustion pressure) as shown in FIG. 7, and also subjected to the load of centrifugal force of rotation. In this regard, at a point of time when the crank angle θ becomes about 8 to 20 degrees, the maximum combustion pressure is applied to the crank pin of the crankshaft via the conrod. The design of the crankshaft aims to improve the flexural rigidity and the torsional rigidity in combination with weight reduction, thereby achieving deformation resistance against the maximum combustion pressure.

Figure 8:
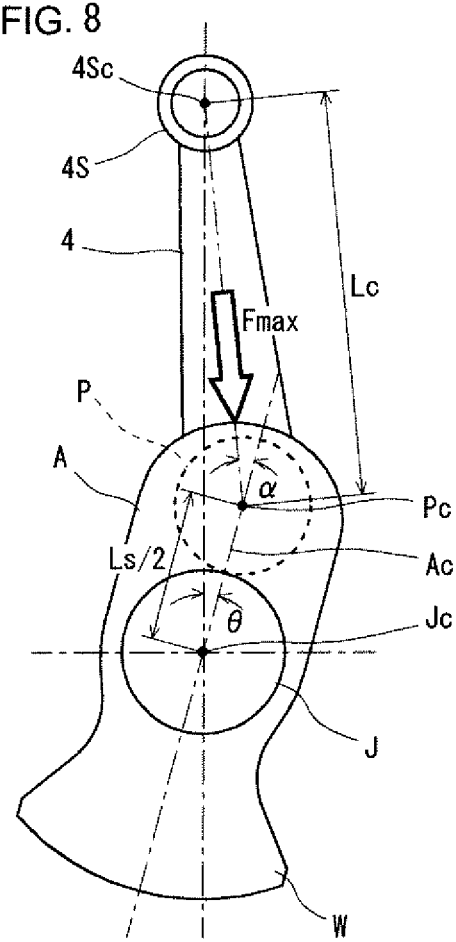
FIG. 8 is an illustration showing the geometric relationship between the crank arm and the conrod at the point of time when the load of combustion pressure reaches a maximum.

FIG. 8 shows the geometric relationship between the crank arm and the conrod at the point of time when the load of combustion pressure reaches a maximum. As shown in FIG. 8, the direction in which the combustion pressure is applied to the crank pin P is a direction from the axis of the piston pin (the axis 4Sc of the small end 4S of the conrod 4) to the axis Pc of the crank pin P. Therefore, the maximum load Fmax due to the maximum combustion pressure acts not in the direction along the crank arm centerline Ac connecting the axis Pc of the crank pin P to the axis Jc of the journal J but in a direction inclined from the crank arm centerline Ac. Thus, in reality, the maximum load Fmax is applied to the crank arm A in a state where the crank angle θ is about 8 to 20 degrees. In other words, the maximum load Fmax acts in a direction inclined at an angle α from the crank arm centerline Ac.

In the following paragraphs, the angle of the direction in which the combustion pressure is applied to the crank arm A (the direction from the axis of the piston pin to the axis of the crank pin) to the crank arm centerline Ac will sometimes be referred to as a load angle β. Among such load angles β, the load angle at which the maximum load Fmax due to the maximum combustion pressure is applied when the crank angle θ is about 8 to 20 degrees will sometimes be referred to as a maximum load angle α.

Figure 9:
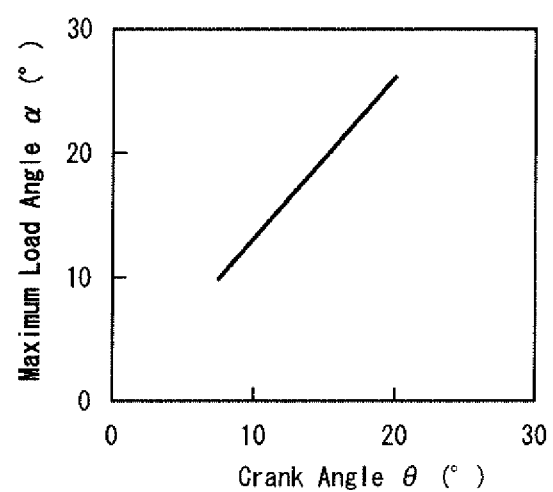
FIG. 9 is a graph showing the correlation between the crank angle θ at the point of time when the load of combustion pressure reaches a maximum and the maximum load angle α.

FIG. 9 is a graph showing the correlation between the crank angle θ at the point of time when the load of combustion pressure reaches a maximum, and the maximum load angle α. With regard to the bending load, the time when the combustion pressure in the cylinder reaches a maximum is the point of time when the crank angle θ becomes about 8 to 20 degrees by slight rotation of the crankshaft from the top dead point in the compression process.

As shown in FIG. 8, the crank arm A is subjected to the maximum load Fmax of the maximum combustion pressure in a direction inclined at the maximum load angle α from the crank arm centerline Ac. The maximum load angle α is determined as an external angle of a triangle defined by one angle and two sides, that is, defined by the crank angle "θ" at the point of time when the load of the maximum combustion pressure is applied the distance "Ls/2", a half of the piston stroke Ls (the distance between the axis Pc of the crank pin P and the axis Jc of the journal J), and the distance "Lc" between the axis 4Sc of the small end 4S of the conrod 4 (the axis of the piston pin) and the axis Pc of the crank pin P. Accordingly, the arm A is subjected to a bending load from a direction inclined at the maximum load angle α (about 10 to a little over 20 degrees), which is a little greater than the crank angle θ (about 8 to 20 degrees), from the crank arm centerline Ac (see FIG. 9).

Figure 10:
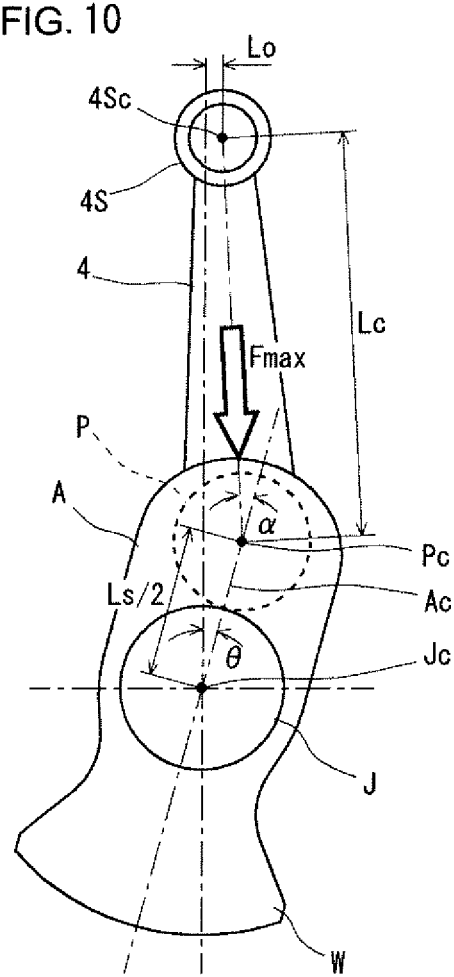
FIG. 10 is a schematic view showing another example of the geometric relationship between the crank arm and the conrod at the time of when the load of combustion pressure reaches a maximum.

FIG. 10 shows another example of the geometric relationship between the crank arm and the conrod at the point of time when the load of combustion pressure is the maximum. In the engine shown by FIG. 10, the axis Jc of the journal J (the rotation axis of the crankshaft) is offset from the central axis of the cylinder. Alternatively, the axis Jc of the journal J is located on the central axis of the cylinder, but the axis of the piston pin is offset from the central axis of the cylinder. In such a case, the maximum load angle α is determined geometrically from a triangle defined in a similar way to the triangle defined in the case of FIG. 8 and the amount of offset Lo.

2-2-1. Overview of Crankshaft of Present Embodiment

As described above, the crank arm is subjected to the maximum bending load in a direction inclined at the maximum load angle α from the crank arm centerline. From this viewpoint, it is an effective way to modify a beam-like crank arm having a reduced weight and a high rigidity to have a laterally asymmetric shape. The reason will be described in the following.

Figure 11:
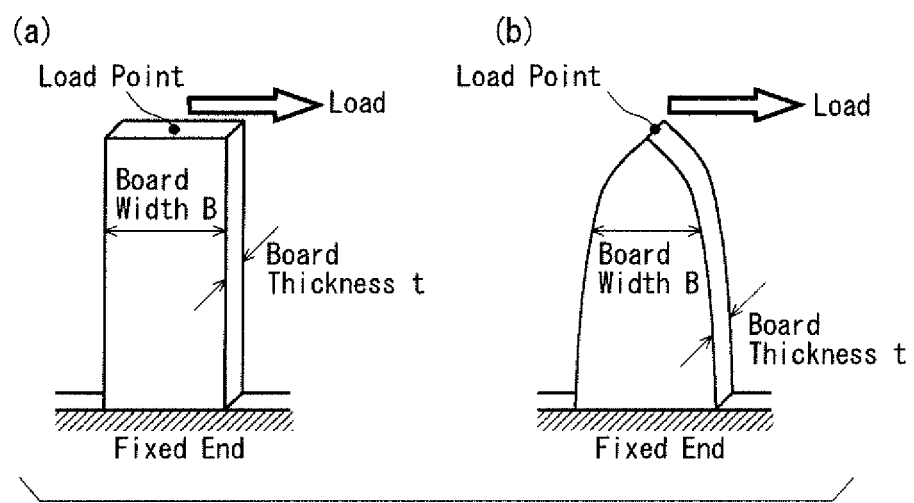

FIGS. 11(*a*) and 11(*b*) show examples of beam shapes according to the beam theory in Strength of Materials. FIG. 11(*a*) shows a rectangular cross-sectional beam, and FIG. 11(*b*) shows a beam that is reduced in weight. A crank arm will hereinafter be considered simply in terms of Strength of Materials, based on the beam theory. In consideration of receiving a bending load, the two-dimensional shape of the most lightweight beam (having a constant board thickness t) that is high in rigidity and low in deformability is not a rectangular cross-sectional beam having a constant board width 13 as shown in FIG. 11(a) but a lightweight beam of which board width B simply increases from the load point to the fixed end as shown in FIG. 11(b).

Figure 12:
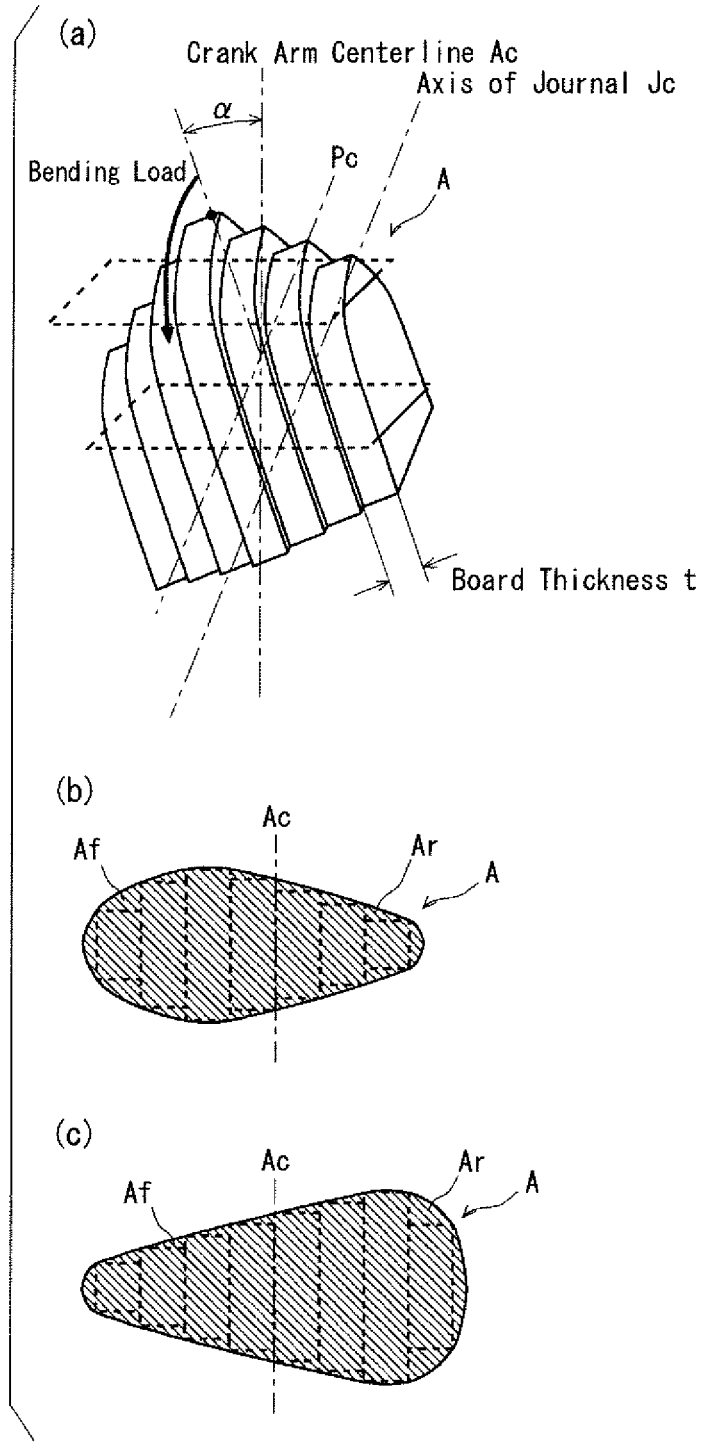

FIGS. 12(a) to 12(c) show a crank arm having a laterally asymmetric shape in accordance with the concept for weight reduction of a beam shown by FIG. 11(b). FIG. 12(a) is a perspective view, and FIGS. 12(b) and 12(c) are sectional views on planes perpendicular to the crank arm centerline. The concept of the crank arm shape shown by FIGS. 12(a) to 12(c) reflects the projected shape shown by FIG. 5(b) since the above formula (21) indicates that the projected shape results in high flexural rigidity. FIG. 12(b) is a sectional view at a position outward of the axis of the crank pin, that is, a sectional view at a position shifted from the axis of the crank pin in the direction away from the journal. FIG. 12(c) is a sectional view at a position inward of the axis of the crank pin, that is, a sectional view at a position shifted from the axis of the crank pin in the direction toward the journal. A crank arm A as shown by FIG. 8 or 10, which is subjected to the maximum bending load in a direction inclined at the maximum load angle $\alpha$ from the crank arm centerline, is considered to be a crank arm as shown by FIG. 12(a) that is a laminate of a plurality of beams with a board thickness of t. By configuring each of the plurality of beams to be a lightweight beam as shown by FIG. 11(b) of which board thickness B simply increases toward the fixed end, a crank arm A that is the most lightweight and high in rigidity can be obtained.

When the crank arm A is cut along planes perpendicular to the crank arm centerline Ac as shown in FIG. 12(a), geometrically, the sections are laterally asymmetric shapes with respect to the crank arm centerline Ac as shown by FIGS. 12(b) and 12(c). Specifically, the crank arm A is divided into a right arm portion Ar and a left arm portion Af with the crank arm centerline Ac marking the border therebetween, and the right arm portion Ar and the left arm portion Af are asymmetric with respect to the crank arm centerline Ac.

Figure 13:
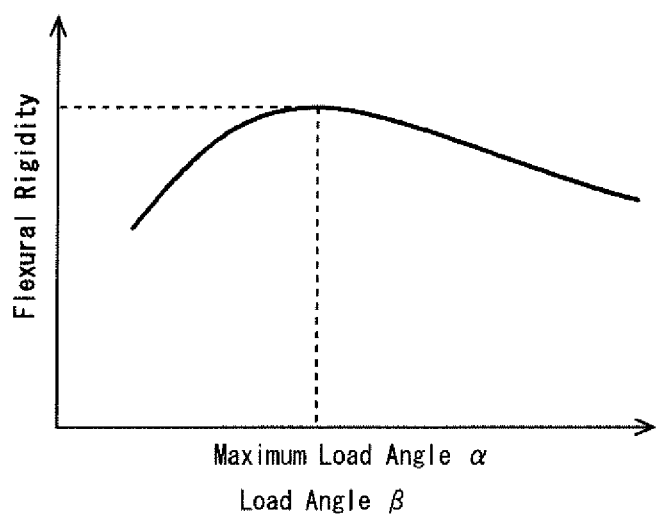
FIG. 13 is a chart showing that the crank arm A is designed to have a maximum flexural rigidity at the point of time when the load of combustion pressure reaches a maximum.

Configuring the crank arm A to be laterally asymmetric efficiently provides a lightweight crank arm A of which rigidity is increased sufficiently to resist against the maximum bending load applied to the crank arm A in a direction at the maximum load angle $\alpha$. Various asymmetric shapes are possible as the shape of the crank arm A. For example, designing the crank arm A, with the load angle $\beta$ used as a parameter and varied, to have a maximum flexural rigidity at the point of time when the load angle $\beta$ becomes the maximum load angle $\alpha$ (that is, at the point of time when the load due to the combustion pressure reaches a maximum) as shown in FIG. 13 is the most efficient way to obtain a lightweight crank arm A with no excess volume. Thereby, the crank arm A is the most lightweight and high in rigidity, and the crankshaft can deliver the best possible performance.

In this regard, as shown in FIG. 12(b), on a cross section at a position outward of the axis of the crank pin, the area moment of inertia of the left arm portion Af that is in the side that is subjected to the maximum load is preferably greater than the area moment of inertia of the right arm portion Ar that is in the side opposite to the side that is subjected to the maximum load. Also, as shown in FIG. 12(c), on a cross section at a position inward of the axis of the crank pin, the area moment of inertia of the right arm portion Ar that is in the side opposite to the side that is subjected to the maximum load is preferably greater than the area moment of inertia of the left arm portion Af that is in the side that is subjected to the maximum load.

In light of these things, in the crankshaft of the present embodiment, the crank arm A has a recess in the surface adjacent to the journal J, in a region inward of a periphery region along the edge of the surface. This reflects the recessed shape since the above formula (10) indicates that the recessed shape results in high torsional rigidity. Further, reflecting the reality of load application, the recess is asymmetric with respect to the crank arm centerline Ac. Accordingly, the shape of the crank arm A is laterally asymmetric with respect to the crank arm centerline Ac. Thus, the shape of the crank arm A is such that the crank arm A has a maximum flexural rigidity at the point of time when the load due to the combustion pressure reaches a maximum. Thereby, in the crank arm, the peripheral region outward of the recess is thick, and the region inward of the peripheral region is thin because of the recess. Further, a region inward of the thin region is thickened. Thereby, the flexural rigidity is improved, and at the same time, a reduction in weight and an improvement in torsional rigidity can be achieved.

2-2-2. Examples of Crank Arm Shape

Figure 14:
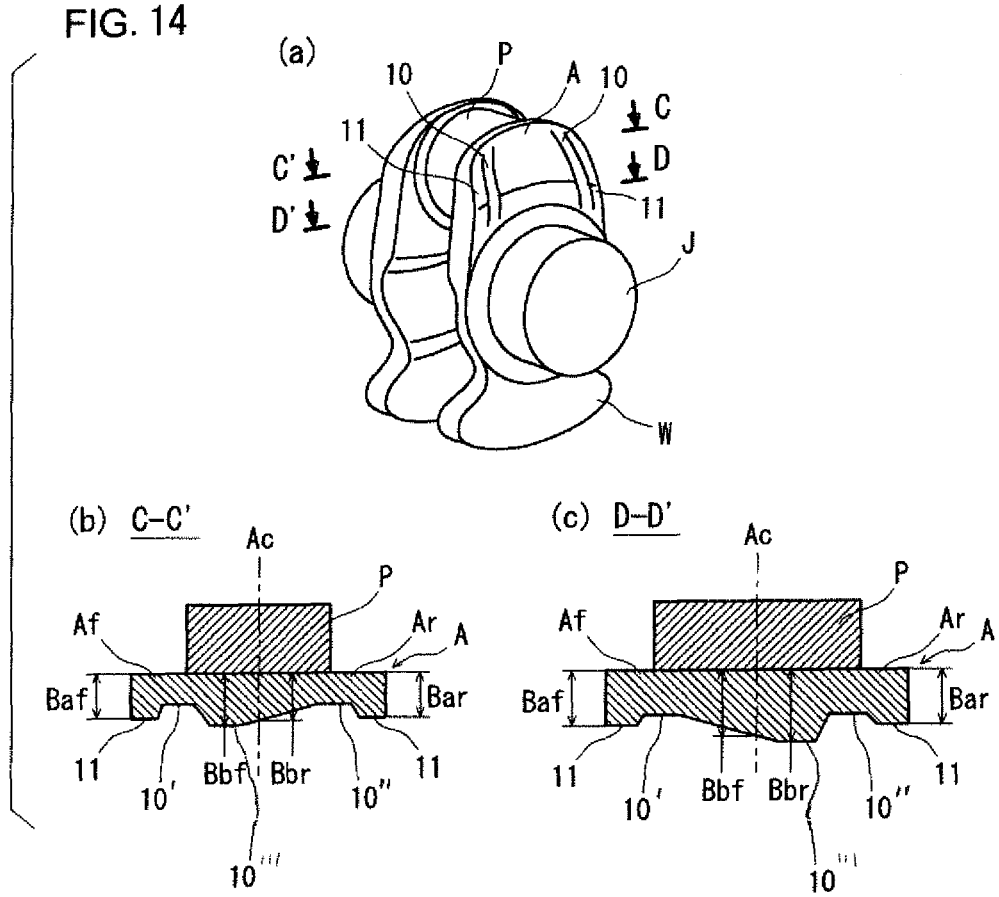
FIGS. 14(a) to 14(c) are diagrams showing an example of the shape of a crank arm of a crankshaft of the present embodiment.
Figure 15:
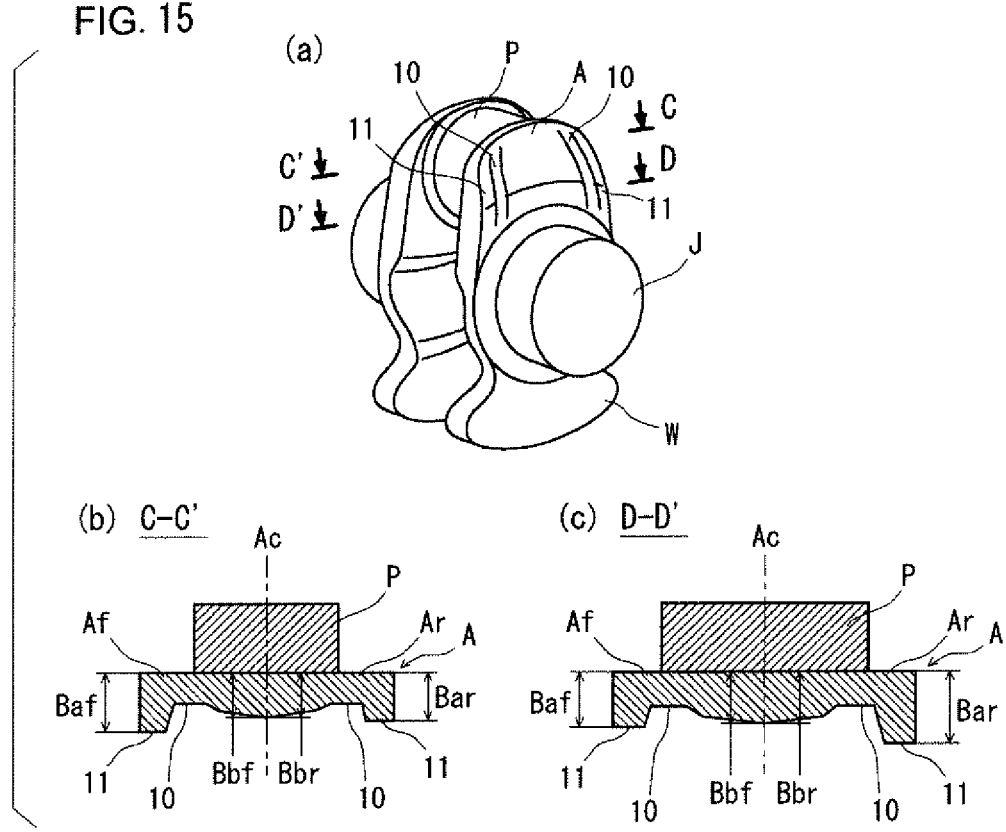
FIGS. 15(a) to 15(c) are diagrams showing another example of the shape of a crank arm of a crankshaft of the present embodiment.
Figure 16:
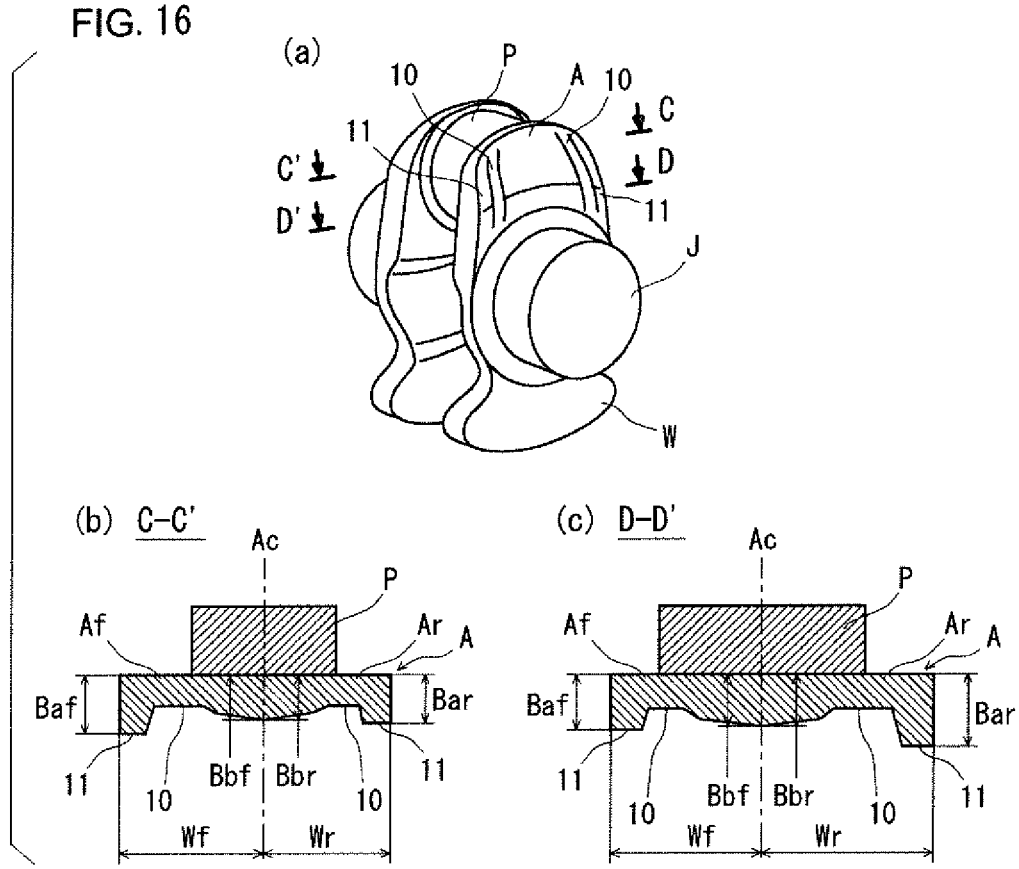
FIGS. 16(a) to 16(c) are diagrams showing another example of the shape of a crank arm of a crankshaft of the present embodiment.
Figure 17:
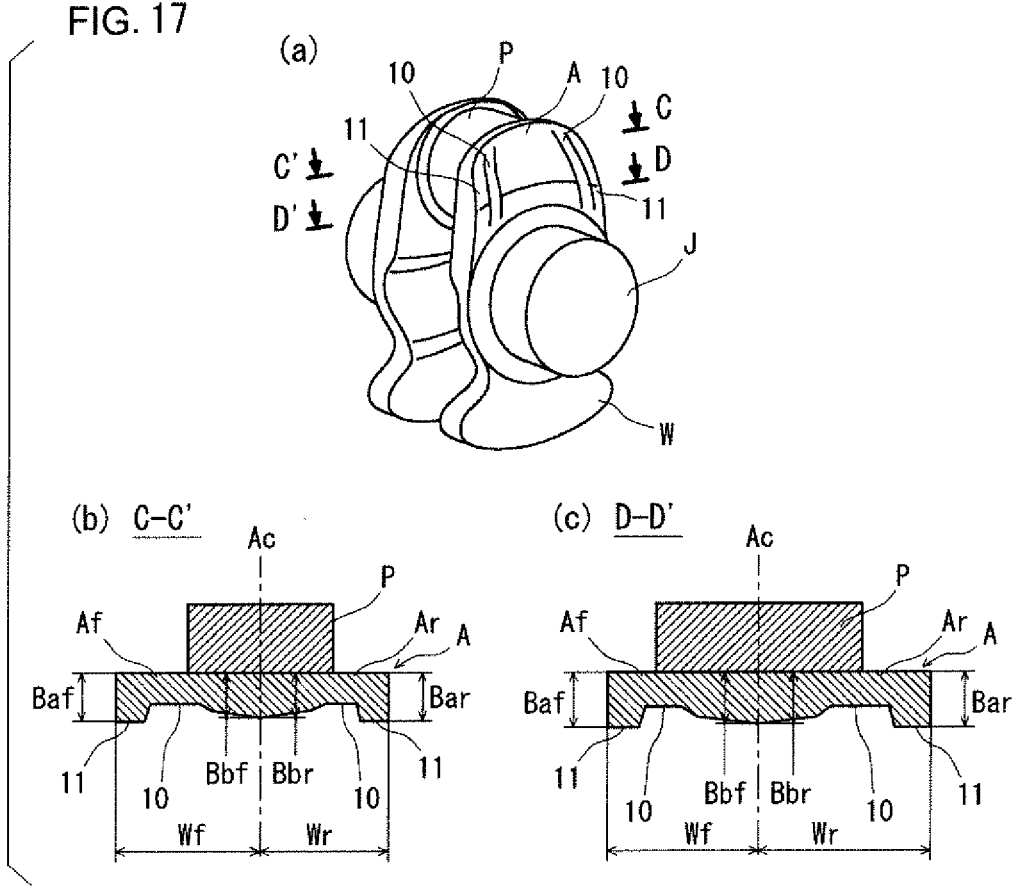
FIGS. 17(a) to 17(c) are diagrams showing another example of the shape of a crank arm of a crankshaft of the present embodiment.

FIGS. 14(a) to 14(c) show an example of the crank arm shape of the crankshaft according to the present invention. FIGS. 15(a) to 15(c) show another example of the crank arm shape of the crankshaft. FIGS. 16(a) to 16(c) and FIGS. 17(a) to 17(c) show still other examples of the crank arm shape of the crankshaft. FIGS. 18(a) to 18(c) show an example of the crank arm shape of a conventional crankshaft. Any of the drawings provided with a reference symbol (a) is a perspective view of a throw, any of the drawings provided with a reference symbol (b) is a sectional view on a plane perpendicular to the crank arm centerline at a position C-C', and any of the drawings provided with a reference symbol (c) is a sectional view on a plane perpendicular to the crank arm centerline at a position D-D', which is different from the position C-C'. The position C-C' shown by the drawings provided with the reference symbol (b) is a position that is outward of the axis of the crank pin. The position D-D' shown by the drawings provided with the reference symbol (c) is a position that is inward of the axis of the crank pin.

Each of the crank arms A shown by FIGS. 14(a) to 14(c), 15(a) to 15(c), 16(a) to 16(c) and 17(a) to 17(c) has recesses 10 on the surface adjacent to the journal 3. Specifically, the crank arm A has a peripheral region 11 along the edge of the surface adjacent to the journal 3. The recesses 10 are formed in a region that is inward of the peripheral region 11 and extend along the peripheral region 11. The recesses 10 include a first recessed portion 10', a second recessed portion 10'', and a raised portion 10''' between the first recessed portion 10' and the second recessed portion 10'', see FIGS. 14(b) and (c).

The recesses 10 are formed in the right arm portion Ar and the left arm portion Af divided by the crank arm centerline Ac, respectively, and the recesses 10 are of different shapes. Specifically, the recesses 10 are provided in a laterally asymmetric manner with respect to the crank arm centerline such that the crank arm A has a maximum flexural rigidity at the point of time when the load onto the crank pin P due to the combustion pressure reaches a maximum. Thus, the crank arm A is laterally asymmetric with respect to the crank arm centerline Ac. Further, as shown by the drawings provided with the reference symbol (b), in a section at a position outward of the axis of the crank pin P, the area moment of inertia of the left arm portion Af that is in the side that is subjected to the maximum load is greater than the area moment of inertia of the right arm portion Ar that is in the side opposite to the side that is subjected to the maximum load. Also, as shown by the drawings provided with the reference symbol (c), in a section at a position inward of the axis of the crank pin P, the area moment of inertia of the right arm portion Ar that is in the side opposite to the side that is subjected to the maximum load is greater than the area moment of inertia of the left arm portion Af that is in the side that is subjected to the maximum load.

In the crank arm A shown by FIGS. 14(a) to 14(c), the thickness of the peripheral region 11 is symmetric with respect to the crank arm centerline Ac. The thickness Bar of the peripheral region 11 in the right arm portion Ar is equal to the thickness Baf of the peripheral region 11 in the left arm portion Af. However, in a section at a position outward of the axis of the crank pin P, the maximum thickness Bbf of the central region in the left arm portion Af is greater than the maximum thickness Bbr of the central region in the right arm portion Ar (see FIG. 14(b)). In a section at a position inward of the axis of the crank pin P, on the other hand, the maximum thickness Bbf of the central region in the left arm portion Af is smaller than the maximum thickness Bbr of the central region in the right arm portion Ar (see FIG. 14(c)).

In the crank arm A shown by FIGS. 15(a) to 15(c), the thickness of the peripheral region is asymmetric with respect to the crank arm centerline Ac. The thickness Bar of the peripheral region 11 in the right arm portion Ar is different from the thickness Baf of the peripheral region 11 in the left arm portion Af. Specifically, in a section at a position outward of the axis of the crank pin P, the thickness Baf of the peripheral region 11 in the left arm portion Af is greater than the thickness Bar of the peripheral region 11 in the right arm portion Ar (see FIG. 15(b)). In a section at a position inward of the axis of the crank pin P, on the other hand, the thickness Baf of the peripheral region 11 in the left arm portion Af is smaller than the thickness Bar of the peripheral region 11 in the right arm portion Ar (see FIG. 15(c)). In the left arm portion Af, the thickness Baf of the peripheral region 11 is greater than the maximum thickness Bbf of the central region. This relationship holds in any section at any position whether outward or inward of the axis of the crank pin P. In the right arm portion Ar also, the thickness Bar of the peripheral region 11 is greater than the maximum thickness Bar of the central region. This relationship holds in any section at any position whether outward or inward of the axis of the crank pin P.

The crank arm A shown by FIGS. 16(a) to 16(c) is a modification of the crank arm A shown by FIGS. 15(a) to 15(c). The difference is as follows. In the crank arm A shown by FIGS. 16(a) to 16(c), in a section at a position outward of the axis of the crank pin P, the width Wf of the left arm portion Af is greater than the width Wr of the right arm portion Ar (see FIG. 16(b)), and in a section at a position inward of the axis of the crank pin P, the width Wf of the left arm portion Af is smaller than the width Wr of the right arm portion Ar (see FIG. 16(c)).

The crank arm A shown by FIGS. 17(a) to 17(c) is a modification of the crank arm A shown by FIGS. 16(a) to 16(c). The difference is as follows. In the crank arm A shown by FIGS. 17(a) to 17(c), the thickness of the peripheral region 11 and the maximum thickness of the central region are symmetric with respect to the crank arm centerline Ac.

The conventional crank arm A shown by FIGS. 18(a) to 18(e), however, has no recesses and is laterally symmetric with respect to the crank arm centerline Ac.

As thus far described, in the crankshafts of the present embodiment shown by FIGS. 14(a) to 17(c), the crank arms A are configured to fit for the reality. Specifically, with respect to each of the crank arms A, the peripheral region 11 is thick in the whole crank arm A. The region inward of the peripheral region 11 is thinned by the recesses 10. The central region further inward of the thinned region is thick. Thereby, the crankshaft has a reduced weight and an increased torsional rigidity in combination with an increased flexural rigidity.

The present invention is not limited to the embodiments above, and various changes and modifications are possible without departing from the scope of the invention. For example, the present invention is applicable to crankshafts to be mounted in a variety of reciprocating engines. Specifically, the engine may have any number of cylinders as well as four cylinders, for example, one cylinder, two cylinders, three cylinders, six cylinders, eight cylinders or ten cylinders, and even more cylinders. The cylinder arrangement may be of any type, for example, in-line type, V-type, opposed type or the like. The fuel for the engine may be of any kind, for example, gasoline, diesel, biofuel or the like. Also, the engines include a hybrid engine consisting of an internal-combustion engine and an electric motor.

INDUSTRIAL APPLICABILITY

The present invention is capable of being effectively utilized in a crankshaft to be mounted in a variety of reciprocating engines.

DESCRIPTION OF REFERENCE SYMBOLS

1: crankshaft
J, J1 to J5: journal
Jc: axis of journal,
P, P1 to P4: crank pin
Pc: axis of crank pin
Fr: front part
Fl: flange
A, A1 to A8: crank arm
Ac: crank arm centerline
Ar: right arm portion
Af: left arm portion
W, W1 to W8: counterweight
4: connecting rod
4S: small end
4Sc: axis of small end (axis of piston pin)
10: recess
11: peripheral region

The invention claimed is:
1. A crankshaft for a reciprocating engine, the crankshaft comprising:
   at least a first journal that defines a central axis of rotation;
   at least a first crank pin that is eccentric with respect to the first journal;
   at least a first crank arm connecting the first journal to the first crank pin; and
   at least a first counterweight integrated with the first crank arm,
   wherein the first crank arm includes a recess in a surface adjacent to the first journal connected thereto, the recess including a first recessed portion, a second recessed portion, and a raised portion between the first recessed portion and the second recessed portion, the recess being disposed in a region inward of a peripheral region along an edge of the surface and extending along the peripheral region, the first recessed portion and the second recessed portion being asymmetric with respect to a crank arm centerline connecting an axis of the first crank pin to the central axis of rotation; and wherein the first crank arm has a maximum flexural rigidity at a point of time when a maximum load is applied to the first crank pin due to a combustion pressure.

2. The crankshaft for a reciprocating engine according to claim 1, wherein the peripheral region of the first crank arm has a thickness that is asymmetric with respect to the crank arm centerline.

3. The crankshaft for a reciprocating engine according to claim 1, wherein when the first crank arm is divided by the crank arm centerline into a right arm portion and a left arm portion, a first direction from the central axis of rotation to an axis of the first crank pin;

a first cross-section of the first crank arm being on a first plane perpendicular to the crank arm centerline, the first cross-section being located at a first position radially outward from the axis of the first crank pin along the first direction, the first cross-section having a first area moment of inertia of one of the right and the left arm portions that is in a side that is subjected to the maximum load and a second area moment of inertia of the other of the right and left arm portions that is in a side opposite to the side that is subjected to the maximum load, the first area moment of inertia being greater than the second area moment of inertia, and a second direction from the axis of the first crank pin to the central axis of rotation;

a second cross-section of the first crank arm being on a second plane perpendicular to the crank arm centerline, the second cross-section being located at a second position between the axis of the first crank pin and the central axis of rotation along the second direction, the second cross-section having a third area moment of inertia of the other of the right and left arm portions that is in the side opposite to the side that is subjected to the maximum load and a fourth area moment of inertia of the one of the right and left arm portions that is in the side that is subjected to the maximum load, the third area moment of inertia being greater than the fourth area moment of inertia.

4. The crankshaft for a reciprocating engine according to claim 3, the first area moment of inertia having a first maximum thickness, the second area moment of inertia having a second maximum thickness, the first maximum thickness is greater than second maximum thickness;

the first maximum thickness and the second maximum thickness are parallel to the central axis of rotation;

the third area moment of inertia having a third maximum thickness, the fourth area moment of inertia having a fourth maximum thickness is greater than the fourth maximum thickness;

the third maximum thickness and the fourth maximum thickness are parallel to the central axis of rotation.

5. The crankshaft for a reciprocating engine according to claim 3, the first area moment of inertia having a first maximum width, the second area moment of inertia having a second maximum width, the first maximum width is greater than the second maximum width;

the first maximum width and the second maximum width are perpendicular to the central axis of rotation and the first direction;

the third area moment of inertia having a third maximum width, the fourth area moment of inertia having a fourth maximum width, the third maximum width is greater than the fourth maximum width;

the third maximum width and the fourth maximum width are perpendicular to the central axis of rotation and the second direction.

* * * * *

UNITED STATES PATENT AND TRADEMARK OFFICE
CERTIFICATE OF CORRECTION

PATENT NO. : 10,385,912 B2
APPLICATION NO. : 15/325112
DATED : August 20, 2019
INVENTOR(S) : Ishihara et al.

Page 1 of 1

It is certified that error appears in the above-identified patent and that said Letters Patent is hereby corrected as shown below:

In the Claims

Column 18, Line 18:
"fourth maximum thickness is greater than the fourth"
Should read:
"fourth maximum thickness, the third maximum thickness is greater than the fourth"

Signed and Sealed this
Twelfth Day of May, 2020

Andrei Iancu
*Director of the United States Patent and Trademark Office*